United States Patent
Steinberg et al.

(10) Patent No.: US 7,385,177 B2
(45) Date of Patent: Jun. 10, 2008

(54) LIGHT GUIDE ROTATION RATE DETECTOR WITH COUPLED OPTICAL RESONATORS

(75) Inventors: Ben-Zion Steinberg, Kfar Saba (IL); Amir Boag, Yavne (IL)

(73) Assignee: Ramot at Tel-Aviv University Ltd., Tel Aviv (IL)

(*) Notice: Subject to any disclaimer, the term of this patent is extended or adjusted under 35 U.S.C. 154(b) by 39 days.

(21) Appl. No.: 11/325,632

(22) Filed: Jan. 5, 2006

(65) Prior Publication Data

US 2006/0145063 A1 Jul. 6, 2006

Related U.S. Application Data

(60) Provisional application No. 60/641,130, filed on Jan. 5, 2005.

(51) Int. Cl.
G01D 5/34 (2006.01)
G01C 19/64 (2006.01)

(52) U.S. Cl. .......................... 250/227.18; 250/227.14; 250/227.19; 250/227.23; 250/227.27; 250/227.28; 356/459; 356/460; 356/461; 356/470; 356/477; 356/480; 385/12; 385/13

(58) Field of Classification Search .......... 250/227.11, 250/227.14, 227.18, 227.19, 227.23, 227.24, 250/227.27, 227.28, 231.12, 578.1; 356/459–461, 356/468, 470, 477, 480; 372/92, 97, 94; 385/12, 13; 73/504.02, 504.08

See application file for complete search history.

(56) References Cited

U.S. PATENT DOCUMENTS

| 4,445,780 | A | 5/1984 | Burns | |
|---|---|---|---|---|
| 6,163,632 | A | 12/2000 | Rickman et al. | |
| 6,941,055 | B2* | 9/2005 | Segawa et al. | 385/129 |
| 6,999,669 | B2* | 2/2006 | Summers et al. | 385/131 |
| 7,012,946 | B2* | 3/2006 | Kim et al. | 372/92 |
| 7,113,319 | B2* | 9/2006 | Segawa et al. | 359/245 |
| 7,123,804 | B2* | 10/2006 | Baba et al. | 385/129 |
| 7,180,598 | B2* | 2/2007 | Willig et al. | 356/460 |
| 2003/0142719 | A1* | 7/2003 | Fan | 372/108 |
| 2004/0202222 | A1 | 10/2004 | Pocholle et al. | |
| 2004/0263856 | A1 | 12/2004 | Willig et al. | |
| 2005/0271340 | A1* | 12/2005 | Weisberg et al. | 385/123 |
| 2006/0245709 | A1* | 11/2006 | Frenkel | 385/129 |

(Continued)

FOREIGN PATENT DOCUMENTS

JP 1-143914 A 6/1989

OTHER PUBLICATIONS

H. J. Arditty et al., "Sagnac effect in fiber gyroscopes", *Optics Letters*, vol. 6, No. 8, pp. 401-403, Aug. 1981.

(Continued)

Primary Examiner—Davienne Monbleau
(74) Attorney, Agent, or Firm—Browdy and Neimark

(57) ABSTRACT

A method and device are presented for use in determining a rate of rotation of an object. The device comprises a light guide comprising an arrangement of a plurality of coupled optical resonators arranged along a curvilinear optical path. This allows for determining a change in at least one of the light phase and frequency affected by the light propagation through the curvilinear path during the device rotation, said change being indicative of the rotation rate of the light guide.

52 Claims, 6 Drawing Sheets

U.S. PATENT DOCUMENTS

2007/0097680 A1* 5/2007 Cao et al. .................. 362/231

OTHER PUBLICATIONS

M. Loncar et al., "High quality factors and room-temperature lasing in a modified single-defect photonic crystal cavity", *Optics Letters*, vol. 29, No. 7, pp. 721-723, Apr. 1, 2004.

O. Painter et al., "Defect modes of a two-dimensional photonic crystal in an optically thin dielectric slab", *J. Opt. Soc. Am. B*, vol. 16, No. 2, pp. 275-285, Feb. 1999.

A. Boag et al., "Narrow-band microcavity waveguides in photonic crystals", *J. Opt. Soc. Am. A*, vol. 18, No. 11, pp. 2799-2805, Nov. 2001.

J. L. Anderson et al., "Electromagnetic Radiation in Accelerated Systems", *Physical Review*, vol. 181, No. 5, pp. 1765-1775, May 25, 1969.

Toshiyuki Shiozawa, "Phenomenological and Electron-Theoretical Study of the Electrodynamics of Rotating Systems", *Proc. IEEE*, vol. 61, No. 12, pp. 1694-1973, Dec. 1973.

Ben Zion Steinberg et al., "Sensitivity analysis of narrowband photonic crystal filters and waveguides to structure variations and inaccuracy", *J. Opt. Soc. Am. A*, vol. 20, No. 1, pp. 138-146, Jan. 2003.

S. Ezekiel et al., (Editors), "Fiber-optic rotation sensors—Tutorial Review", *Springer Series in Optical Sciences*, Springer Verlag 1982—(abstract).

B. Z. Steinberg et al., "Sagnac Effect in Rotating Photonic Crystal Micro-Cavities and Miniature Optical Gyroscopes," CWL6, CLEO/QELS 2006, Long Beach, CA.

B. Z. Steinberg et al., "Splitting of Micro-Cavity Degenerate Modes in Rotating Photonic Crystals—The Miniature Optical Gyroscopes," J. Opt. Soc. Am. B/vol. 24, No. 1, pp. 142-151, Jan. 2007.

B. Z. Steinberg et al., "Slow-Light Waveguides with Mode Degeneracy: Rotation Induced Super Structures and Optical Gyroscopes", Optical Society of America, 2006.

B. Z. Steinberg et al., Rotation Induced Super Structure in Slow-Light Waveguides w Mode Degeneracy, School of EE, Tel-Aviv University, PowerPointPresentation.

A. B. Matsko et al,. "Optical gyroscope with whispering gallery mode optical cavities", Optical Communications, No. 233, pp. 107-112, 2004.

U. Leonhardt et al., "Ultrahigh sensitivity of slow-light gyroscope", Physical Review A, vol. 62, 2000, 055801.

* cited by examiner

US 7,385,177 B2

LIGHT GUIDE ROTATION RATE DETECTOR WITH COUPLED OPTICAL RESONATORS

FIELD OF THE INVENTION

This invention relates to optical gyroscopes based on the principles of the Sagnac effect.

BACKGROUND OF THE INVENTION

The Sagnac effect, in its original definition, is known as the relative phase shift between two beams of light that have traveled an identical path in opposite direction in a rotating frame. Generally speaking, the Sagnac effect deals with light that propagates along a circular or closed-loop path in a rotating medium. Phase accumulation along the path that is co-directed with rotation differs from that associated with the counter-directed one.

The Sagnac effect (i.e., the phase, accumulated by a light signal that propagates along a slowly rotating circular path, depends linearly on the system's angular velocity $\Omega$) has been studied quite extensively in the literature. The interest stems not only from the theoretical view-point, but also from the practical one. Highly sensitive rotation measurement devices can be designed using this effect [S. Ezekiel and H. J. Arditty, editors, *Fiber-Optic Rotation Sensors*, Springer Series In Optical Sciences, Springer-Verlag 1982; H. J. Arditty and H. C. Lefevre, "Sagnac E ect in Fiber Gyroscopes," *Optics Letters*, 6(8), 401-403 (1981); H. C. Lefevre, "Fundamentals of the Interferometric Fiber-Optic Gyroscope," *Optical Review*, 4(1A), 20-27 (1997)]. For instance, modern fiber-optic gyroscopes, known as Sagnac interferometers, and used for navigation are based on this effect. They allow highly accurate measurements of rotation rates.

Some devices utilizing the Sagnac effect are configured as a ring-like interferometer, also called a Sagnac interferometer. Here, a beam of light is split into two beams. The two beams are made to follow trajectories in opposite directions. On return to the point of entry, the light is allowed to exit the device in such a way that an interference pattern is obtained. The position of the interference fringes is dependent on the angular velocity of the setup in which the device is installed. Usually, several mirrors are employed, so that the light beams follow a triangular or square trajectory. Optical fiber can also be employed to guide the light. The ring interferometer is located on a platform that can rotate. When the platform is rotating, the lines of the interference pattern are displaced sideways as compared to the position of the interference pattern when the platform is not rotating. The amount of displacement is proportional to the angular velocity of the rotating platform. The axis of rotation does not have to be inside the enclosed area.

Various optical gyroscopes are described for example in the following patent publications:

U.S. Pat. No. 4,445,780 discloses a Sagnac gyroscope, for measuring rotation rates. The gyroscope has an optical coupler, adapted for being fabricated by integrated optical techniques, which is compact and provides for operation of the gyroscope at quadrature for small rotation rates. The optical coupler is a symmetrical, channel waveguide structure comprising a two-mode central waveguide branching into three one-mode input waveguides at one end and into two one-mode output waveguides at the other end. The output waveguides are optically coupled to the ends of a fiber-optic loop which provides a closed optical path in which the Sagnac phase shift is produced. The middle input waveguide is adapted to transmit an incident beam into the optical coupler while the outer input waveguides are adapted to transmit the output beams of the Sagnac gyroscope to a circuit for measuring and comparing the intensities of the beams in the outer waveguides so that the rotation rate may be determined.

U.S. Pat. No. 6,163,632 discloses an integrated optical circuit for use in a fiber optic gyroscope which senses rotation rates by determining a phase shift due to the Sagnac effect between light beams traveling around an optical fiber sensing loop in opposite directions. A circuit is provided on a silicon-on-insulator chip comprising a layer of silicon separated from a substrate by an insulating layer. This circuit comprises: rib waveguides formed in the silicon layer for receiving light from a light source and transmitting light to a light detector; fiber optic connectors in the form of grooves etched in the silicon layer for receiving the respective ends of the optical fiber sensing loop; rib waveguides formed in the silicon layer for transmitting light to and from said fiber optic connectors so as to direct light beams in opposite directions around the sensing loop and receive light beams returning therefrom; phase determining means integrated in silicon layer for determining a phase shift between the light beams returning from the sensing loop.

JP 1143914 discloses a gyroscope configured for detecting the phase difference generated between two light beams which are propagated in an optical waveguide on an optical path substrate in the mutually opposite direction and guided out of both ends, and finding a rotary angular velocity. In this configuration, light from a laser is split by a beam splitter and made incident on both ends of optical fibers through lenses. Then, those light beams are guided to the optical waveguide on a transparent plate type medium and projected from the opposite sides of the fibers. Those light beams are collimated by the lenses, put together by the splitter, and made incident on a photodetector, which detects variation in the light intensity. When this gyro rotates at some angular velocity, the light beams have the phase difference calculated from a prescribed equation through Sagnac effect. Then light intensity detected by the photodetector varies periodically every time the phase difference reaches $2\pi$, so the angular velocity is found from the output of the detector.

U.S. Patent Publication 2004/0202222 discloses a solid-state laser gyro, that comprises a solid-state resonator block, in which an optical path followed by two counterrotating waves generated by an optical-gain laser medium is defined, and the gain medium is attached to the resonator and is made of a rare-earth-doped crystal.

U.S. Patent Publication 2004/0263856 discloses a photonic crystal interferometric optical gyroscope system including a light source for providing a primary beam of light, a photonic crystal (i.e. a photonic crystal fiber) sensing coil having a rotational axis, and a beam controlling device configured to split the primary beam into first and second counter-propagating beams in the photonic crystal sensing coil and configured to direct return of the counter-propagating beams wherein the power of the returning counter-propagating beams represents the phase shift between the counter-propagating beams and is indicative of the rate of rotation of the coil about the rotational axis.

SUMMARY OF THE INVENTION

There is a need in the art to facilitate rotation sensing, i.e., measurement of the rotation rate, by providing a novel gyroscope configuration capable of sensing slow rotations as well as being of a small size for a given (required) optical length of light propagation therethrough.

The present invention solves the above problems by providing an optical device and method for rotation sensing utilizing the light propagation through a curvilinear optical path formed by coupled optical resonators.

It should be understood that the term "curvilinear path" signifies any non straight path, namely a curved path formed by arc-like segments, or serpentine (zigzag) path formed by arc-like segments or straight segments, or spiral-like path.

According to one broad aspect of the invention, there is provided a method for rotation sensing comprising passing light through a rotating light guide comprising an arrangement of a plurality of coupled optical resonators arranged along a curvilinear optical path, thereby enabling determination of a change in at least one of the light phase and frequency affected by the light propagation through the rotating curvilinear path, said change being indicative of the rotation rate of the light guide.

According to another broad aspect of the invention, there is provided a device for determining a rate of rotation of an object with which the device is associated, the device comprising a light guide comprising an arrangement of a plurality of coupled optical resonators arranged along a curvilinear optical path, thereby enabling determination of a change in at least one of the light phase and frequency affected by the light propagation through the curvilinear path during the rotation, said change being indicative of the rotation rate of the light guide.

Preferably, the coupled optical resonators are microcavities in a photonic crystal.

Preferably, the coupled optical resonators are arranged along a circular path, or any other closed loop path that is designed as to reduce to a minimum the unwanted reflections that may take place at regions of non-uniformities (such as corners or sharp turns). Such unwanted reflections may reduce the device sensitivity.

In one embodiment of the invention, the light guide is configured as a closed loop light guide (e.g., a circle). In this configuration, the optical resonators may be microcavities in a photonic crystal, or may be small closed-loop resonators arranged along a common closed-loop waveguide (light guide).

The optical resonators (e.g., microcavities in photonic crystal) may be arranged all along the closed loop light guide, a light source being located outside the light guide with an appropriate coupling of light generated by the light source into the light guide. In this case, input light when being coupled into the light guide becomes split into first and second light components (e.g. of substantially equal intensities) propagating in the light guide in the opposite directions. Detection of light resulting from combination of the first and second light components allows for determining the phase change affected by the light propagation through the rotating curvilinear path.

According to another example, the optical resonators (e.g., microcavities in photonic crystal) may be arranged all along the closed loop light guide, a light source being located outside the light guide with an appropriate coupling of light generated by a finite bandwidth light source into the light guide. In this case, input light when being coupled into the light guide becomes split into first and second light components propagating in the light guide in the opposite directions, each forming a resonator of resonators. Each of these closed loop of resonators forms by itself a resonator, the resonant frequency of which is determined by the direction of propagation (i.e. co-directed with rotation, or counter directed with rotation) and by the rotation rate. Detection of light resulting from combination of the first and second light components allows for determining the resonance frequency change affected by the light propagation through the rotating curvilinear path. It should be noted that since the light source is wide-band, the co-rotation propagation resonator will transmit light with essentially one frequency, and the counter-rotation propagation resonator will transmit light with essentially another frequency. Then, the beats of these two resonances can be measured.

In yet another example, the light guide may incorporate an active medium (constituting a light source) thereinside with the curvilinear path coupling the opposite sides of the active medium. In this case, rotation of the light guide with the active medium therein results in a change in the frequency (beat frequency) of light produced (for example: as a result of pumping) by the active medium. Detection of this beat frequency allows for determining the rotation rate.

In another embodiment of the invention, the light guide is configured to define first and second optical paths (at least one of them being curvilinear and containing the coupled optical resonators) having spaced-apart input and output coupling regions between them. In this case, input light becomes split, at the input coupling region, into first and second light components propagating through the first and second paths, respectively, and combined light resulting from superposition of the first and second light components at the output coupling region is detected. The measured phase change between the first and second light components caused by the rotation of the light guide is indicative of the rotation rate. The phase change can be determined from a ratio between the intensities of the output combined light and input light.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF EXEMPLARY EMBODIMENTS

Figure 1:
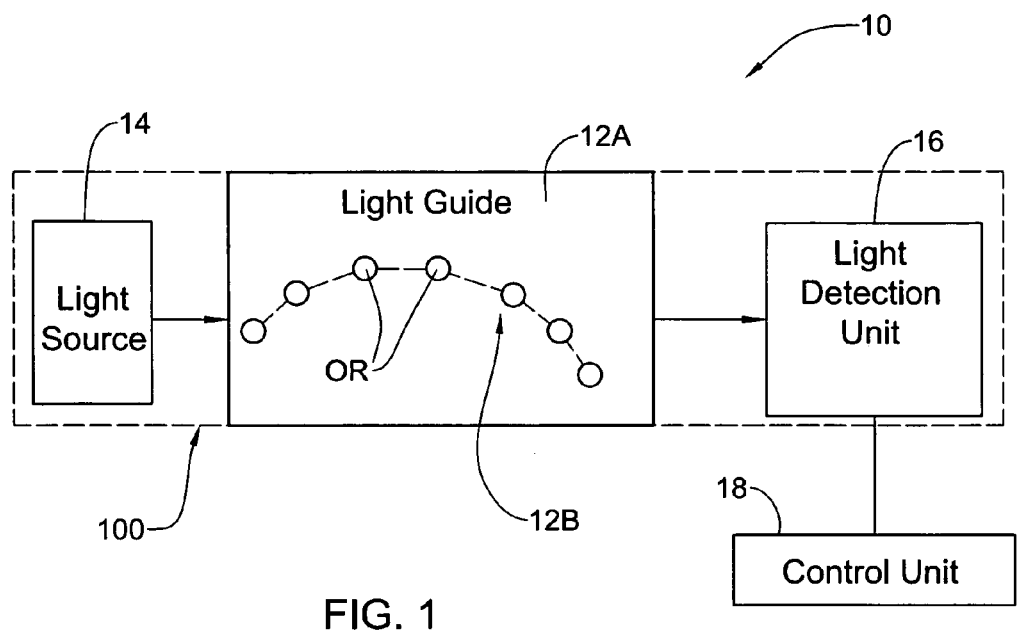
FIG. 1 is a block diagram of a system utilizing a device of the present invention for the rotation sensing.

Referring to FIG. 1, there is illustrated, by way of a block diagram, a system 10 utilizing a device 100 of the present invention. Device 100 includes a light guide 12A including an arrangement of a plurality of coupled optical resonators, generally at OR. The optical resonators are arranged along a curvilinear optical path 12B.

Light guide 12A is associated with a light source assembly 14, and a light detection unit 16. It should be noted and will be exemplified further below that light source assembly 14 includes a light emitting unit, which may be located outside device 100 (i.e. outside light guide 12A) in which case an appropriate input port is made in the light guide to enable coupling of light from the light emitting unit into light guide 12A, or may be located inside the light guide. The light detection unit 16 also may or may not be mounted within the light guide. Device 100 is associated with a control unit 18. The latter is connectable (through wires or wireless) to the output of light detection unit 16 and configured for processing data generated by the light detection unit in response to collected light from the light guide.

The inventors have found that light propagation through a rotating light guide with a curvilinear path of coupled optical resonators allows for determining the rotation parameters. When light guide 12A is subjected to rotation about an axis forming a certain non-zero angle with (preferably, substantially normal to) the plane defined by the curvilinear path, light components of the same frequency propagating in opposite directions though curvilinear path 12B of optical resonators travel different optical lengths to the detector due to the rotation. Their phases when arriving to the detector are indicative of these different optical lengths, and are thus indicative of the rotation rate. Alternatively, the case may be such that the light guide is configured as a resonator cavity (as will be described further below). Rotation of such a resonator cavity will induce a change in the optical length, thus causing a frequency shift of light emerging from the resonator cavity. This frequency shift is indicative of the rotation rate. Thus, the device of the present invention enables determination of a change in at least one of the light phase and frequency affected by light propagation through curvilinear path 12B during the rotation of light guide 12A. This phase and/or frequency change is indicative of the rotation rate of the light guide. Control unit 18, which is typically a computer system having inter alia, memory, processing and data input/output utilities, is configured for processing the measured data (indicative of the collected light) to determine phase and/or frequency change of light and calculate the rotation rate.

It should be understood that the slower the rotation to be sensed, the longer the optical path needed. The provision of the curvilinear path formed by the coupled optical resonators allows for obtaining a longer optical path of light propagation for a given length of the light guide between the light source and detector. This is due to substantial delays caused by light passage through the optical resonators ("trapped mode" of propagation).

Figure 2:
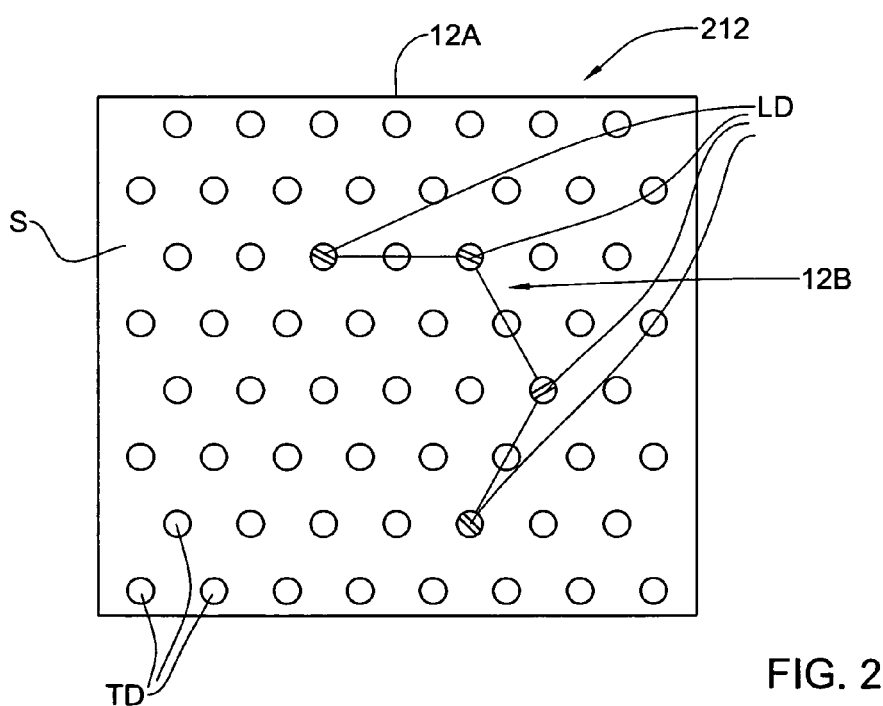
FIG. 2 shows an example of a light guide suitable to be used in the device of FIG. 1.

Referring to FIG. 2, there is shown an example of a light guide 12A suitable to be used in the device of FIG. 1. The light guide is implemented as a photonic crystal 212 realized by making a two-dimensional array of holes TD in a slab S, made of some dielectric host material. This host material may be gain material and may be pumped by an external energy source to provide full or partial compensation for scattering and material losses and/or to provide lasing effect [M. Loncar et al., "High quality factors and room-temperature lasing in a modified single-defect photonic crystal cavity," Optics Letters 29(7) pp. 721-723, 2004]. The two-dimensional array of holes TD has a hexagonal lattice, though generally it could have a square lattice or any other lattice creating a photonic crystal (PhC). The dimensions of slab S in the transverse (x-y) plane, x and y being the coordinate axes, are related to the number of PhC cells. The thickness of slab S is selected so as to create the necessary confinement of the optical signal in z-direction [O. Painter, J. Vuckovic, and A. Scherer, "Defect modes of a two-dimensional photonic crystal in an optically thin dielectric slab," JOSA B 16(2) pp 275-285 1999]. All these constructional features of photonic crystals are known per se and do not form part of the invention.

The invention utilizes the light guide formed by such photonic crystal 212 in which local defects LD of cavity type, the so-called "microcavities", are made being arranged along a curvilinear optical path 12B. These local defects are coupled. They may be implemented as holes omitted from the array of those forming a photonic crystal, or holes with different radius and/or holes filled with material(s) different from the material of the slab.

Each of the isolated local defects forms a high-Q microcavity that can trap light at frequency $\omega_0$ within the frequency band gap of the background perfect PhC (the trapped mode. In this connection, it should be understood that the microcavities in photonic crystal may be created by any known technique. Light is trapped at the local defect only if the rest of the crystal is "forbidden" for propagation (otherwise, light will simply "escape" into the surrounding crystal). This is a necessary condition for the defect to become a resonator. A linear array of e.g. equally spaced identical local defects—optical resonators, situated within an otherwise perfect photonic crystal, forms a waveguide [A. Boag and Ben Z. Steinberg, "Narrow Band Microcavity Waveguides in Photonic Crystals," J. Opt. Soc. Am. A, 18(11), 2799-2805 (2001)]. Without losing the generality, this waveguide may be regarded as a coupled cavity waveguide (CCW).

Comparing the CCW with the waveguides typically used in rotating optical systems, the following should be noted. The first difference stems from the basic physics associated with light propagation mechanism. In classical systems, the phase accumulation due to propagation of light is essentially that of a plane wave or a fiber-optical mode. However, in the CCW case, signal propagation is based on coupling (sometimes also referred as hopping or tunneling) of light from one microcavity to the next. Thus, in the CCW based system, the propagation mechanism is quite different from that of a conventional fiber or laser resonator. The second important difference of CCW is associated with the dispersion relation and bandwidth for light propagating therein.

The inventors have found that, dissimilar to relatively weak dispersion and large bandwidth of plane waves or fiber optical modes, the CCW propagation modes, constructed via a global treatment of the local tunneling (i.e. coupling) effects described above, are relatively narrow-band and possess essentially a Floquet-Bloch character, when CCW is of a periodic structure. The invention utilizes these features of CCW in photonic crystals in some embodiments of the invention.

The following are some examples of the implementation of the device of the present invention. The same reference numbers are used for identifying components that are common in all the examples of the invention.

Figure 3:
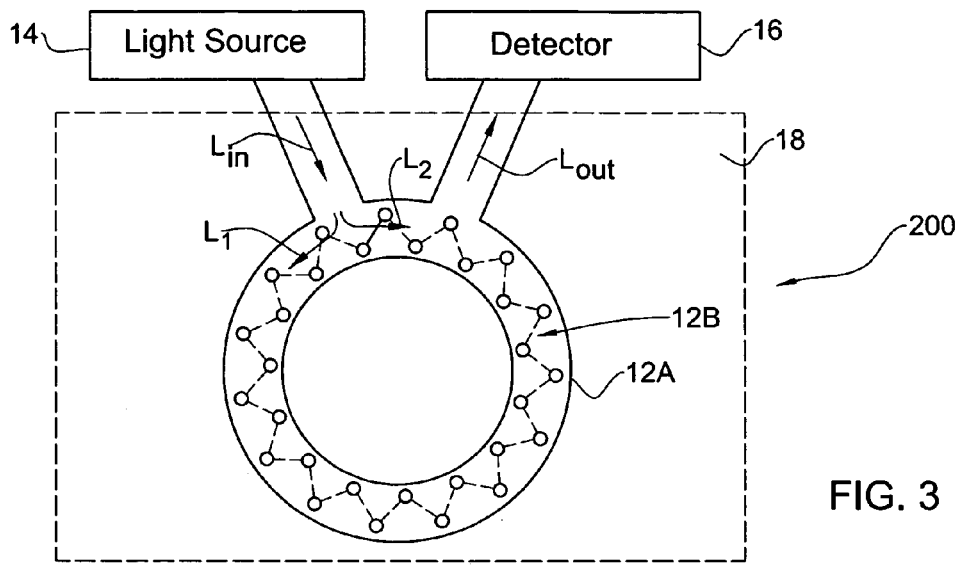
FIG. 3 is a schematic illustration of an example of the present invention utilizing a closed loop photonic crystal light guide with an array of optical resonators constituted by local defects in the crystal arranged in a curvilinear path, and an external light source.

FIG. 3 exemplifies a device 200 configured as a gyroscope (generally as a rotation sensor) utilizing a closed-loop configuration of a light guide 12A. In the present example, a light source assembly 14 and a light detection unit 16 are located outside the light guide appropriately optically coupled thereto. Also, in the present example, light guide 12A is a photonic crystal having an array of local defects arranged to form a curvilinear path 12B. The local defects in the photonic crystal are configured (i.e., dimensioned and spaced apart) to operate as coupled optical resonators.

Device 200 operates as follows: Input light $L_{in}$ from light source 14 while being coupled into light guide 12A becomes split into first and second light components $L_1$ and $L_2$ propagating in opposite directions through the light guide. These light components are combined at the output of the light guide, and thus output light $L_{out}$ collected at detector 16 presents superposition of these light components.

It should be noted that in this example the length of the closed loop path is selected to provide a resonance condition for a certain frequency of light within the CCW bandwidth. Preferably, this length is selected to provide a resonance condition at the frequency of the isolated defect $\omega_0$. Then the device of the present invention will be capable of utilizing the light circulation (making at least a round-trip) in the light guide. With the resonance condition present, the phase accumulating during the light's round trip is an integer multiple of $2\pi$.

Also, preferably, device 200 has an electromagnetic protecting housing (package) 18 configured for shielding the device from external electromagnetic fields. It should be noted that light source 14 and/or detector 16 may be located inside or outside the package. Such a package may be fabricated for example from a metal material; it may seal the device for its entire lifetime. The provision of the package is associated with the following. It is known that for optical gyroscopes based on Sagnac effect, the clockwise and counter-clockwise propagation paths are preferably as reciprocal as possible for $\Omega_0=0$. Since the photonic crystal with defects arranged in a curvilinear channel provides the light guide to be of an extremely small footprint (for a given optical length of the light guide), variations of environmental conditions across the device are advantageously reduced. Moreover, the remaining disturbances caused e.g. by the external electromagnetic fields can be relatively easy decreased even further. To this end electromagnetic protecting package 18 is preferably added. The task of protecting the device from environmental disturbances (e.g. caused by temperature, stress or other field variations) is solved relatively easy for the device of the present invention, thanks to its miniature dimensions especially in a single-chip implementation.

Also, it should be noted, that the reciprocity for the clockwise and counter-clockwise propagation paths at rest in the absence of environmental disturbances is another advantageous feature of the device of the present invention. This is because light between cavities is transferred by coupling, the process seriously reducing the width of the propagation channel.

Additionally, it should be noted that in device 200, light source 14 may be a finite bandwidth light source, and light therefrom is appropriately coupled into light guide 12A (e.g. photonic crystals with microcavities). In the case of finite bandwidth light source, input light when being coupled into the light guide becomes split into first and second light components propagating in the light guide in the opposite directions, each forming a resonator of resonators. Each of these closed loop of resonators forms by itself a resonator, the resonant frequency of which is determined by the direction of propagation and by the rotation rate. Light resulting from combination of the first and second light components is detected. This allows for determining the resonance frequency change affected by the light propagation through the rotating curvilinear path. It should be noted that since the light source is wide-band, the co-rotation propagation resonator will transmit light with essentially one frequency, and the counter-rotation propagation resonator will transmit light with essentially another frequency. Then, the beats of these two resonances can be measured.

Figure 4:
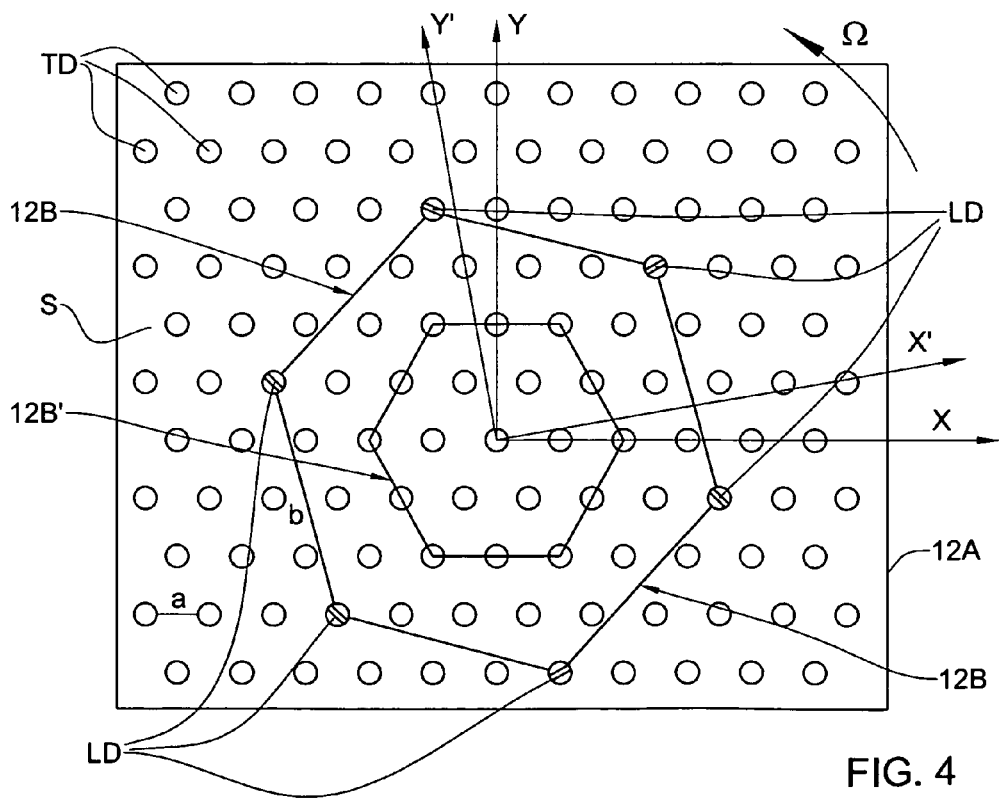
FIG. 4 shows another example of a light guide of the present invention for use in a gyroscope system.

FIG. 4 shows another example of a light guide 12A for use in a gyroscope system. The light guide is configured to define a closed loop (constituting a curvilinear path) 12B of local defects LD within a two dimensional array of holes TD of a photonic crystal. Such a closed loop of local defects behaves as a ring resonator coupled cavities waveguide (RR-CCW). Local defects LD present a plurality (six in the present example) of microresonators making a circular or, more exactly, hexagonal, path 12B. Also shown in the figure is a smaller ring 12B', for the purposes of further explanation with reference to FIG. 6.

Arranging microcavities along a circular path or another smooth path brings an extra advantage of reduced reflections on regions of non-uniformities (e.g. corners, sharp turns).

In general, microcavities may be of any shape, including not cylindrically symmetrical shapes (e.g. of square, triangular, or hexagonal cross-section). In FIG. 4 microcavities' orientations are illustrated by stripes inside the circles denoting microcavities LD. In a preferred configuration, the RR-CCW may be considered as a CCW folded back upon itself, in angle that preserves symmetry properties along the CCW, such that the electromagnetic coupling between each two locally adjacent and optically coupled cavities is the same for all the cavities (that is: the relative orientation of each microcavity with respect to it's neighbors is preserved along the path). In the present example, the total number of microcavities M equals six. However, in general there may be a much larger number of resonators and not necessarily arranged in a circular loop.

The invention, in its one aspect, provides for using a CCW-based light guide in a gyroscope system, where different dispersions for light propagating in opposite directions are achieved during the system rotation. In particular, in such a gyroscope set up, the Sagnac effect uniquely depends inter alia on the light bandwidth used and frequency dispersion. In the device of the present invention this dispersion effect is advantageously utilized.

In order to understand how the dispersion effect (different dispersions for light propagating in opposite directions) is achieved in the gyroscope system of the invention, let us consider an RR-CCW in a photonic crystal being at rest (a rotation rate $\Omega=0$) in an inertial system.

In this connection, it should be noted that according to the aforementioned Boag et al, the tight binding/weak coupling perturbation theory has been used to study linear (straight, not curvilinear) CCW at rest, where the governing wave equation is self-adjoint. Thus, the variational solution procedure adopted in Boag et al holds only for self-adjoint operators.

Since self-adjointness will be lost due to rotation, a proper mathematical foundation (i.e. not relying on variational principles) for the case of $\Omega \neq 0$ should be first established. Also, for the purposes of the invention, Maxwell equations based on the description of electrodynamics of accelerating or rotating systems [J. L. Anderson and J. W. Ryon, "Electromagnetic Radiation in Accelerated Systems," *Phys. Rev.* 181, 1765-1775 (1969) and T. Shiozawa, "Phenomenological and Electron-Theoretical Study of the Electrodynamics of Rotating Systems," *Proc. IEEE* 61, 1694-1702 (1973)] are used. This set of equations differs from the conventional set of Maxwell's equations essentially by the introduction of modified constitutive relations taking into account the effect of the angular velocity $\Omega$. As described further below, the resulting wave equation is no longer self-adjoint, being thereby indicative of that the clockwise and counter clockwise propagations possess different dispersions in a rotating system.

We start with a system at rest. Let us assume a photonic crystal made of a dielectric material with the permittivity $\epsilon = \epsilon_0 \epsilon_r(r)$ and the constant vacuum permeability $\mu = \mu_0$. A time harmonic dependence $e^{-i\omega t}$ is assumed and suppressed. The magnetic field H is governed by the wave equation $$\Theta H = (\omega/c)^2 H, \quad (1)$$

where $c = (\epsilon_0 \mu_0)^{-1/2}$ is the speed of light in vacuum, and the operator $\Theta$ is defined as $$\Theta = \nabla \times \frac{1}{\varepsilon_r(r)} \nabla \times \quad (2)$$

The relative permittivity of the perfect periodic PhC is denoted as $\epsilon_p(r)$, and that of the photonic crystal with the presence of a single, isolated microcavity located at the reference (defect) location $r_0$ – as $\epsilon_d(r-r_0)$. The reciprocal difference $d(r;r_0)$ is defined:

$$d(r; r_o) = \frac{1}{\varepsilon_d(r - r_o)} - \frac{1}{\varepsilon_p(r)} \quad (3)$$

Locations of the RR-CCW local defects are denoted $r_n$, $n=0, \ldots, M-1$, where M is the total number of the microcavities (M=6 in FIG. 4). Using (3), the reciprocal of $\epsilon_r(r)$ (dielectric property of the entire structure) can be expressed:

$$\frac{1}{\varepsilon_r(r)} = \frac{1}{\varepsilon_p(r)} = \sum_{n=0}^{M-1} d(r; r_n) \quad (4)$$

With this definition, $\Theta$ can be expressed as the sum of operators:

$$\Theta = \Theta^{per} + \sum_{n=o}^{M-1} \Theta_n, \quad (5)$$

where $\Theta^{per}$ and $\Theta_n$ are defined as in (2), with $1/\epsilon_r(r)$ being replaced by $1/\epsilon_p(r)$ and by $d(r;r_n)$, in operators $\Theta^{per}$ and $\Theta_n$ respectively.

The magnetic field associated with the single, isolated microcavity at location $r_n$, is denoted as $H_n$. This is a trapped mode magnetic field. Considering this specific example of the identical local defects, all the defects resonate at the same frequency $\omega_0$. The latter is the resonance frequency of each of the micro-resonators of the entire CCW, in the absence of the rest of the resonators (it is also the central frequency of the corresponding CCW if not closed into a loop). Further, the notation $H_n(r) = H^{(0)}(r-r_n)$, where $H^{(0)}(r)$ is the trapped mode field corresponds to a condition of the microcavity being located at the origin. These fields satisfy the eigenvalue equation:

$$(\Theta^{per} + \Theta_n)H_n = (\omega_0/c)^2 H_n, \, ImH_n(r)=0, \, n=1, \ldots, M-1. \quad (6)$$

where $H_n$ is the eigenfunction and $(\omega_0/c)^2$ is the eigenvalue. Since the differential operator in (6) is self-adjoint and all the equation coefficients are real, $H_n(r)$ can always be normalized to be real. Since the $H_n$'s are highly localized within the isolated microcavities and decay fast outside them, and since the RR-CCW cavities are widely spaced, it can be assumed that the field within each of the cavities of the entire RR-CCW is essentially the same as the isolated cavity mode $H_n(r)$. Thus, the total field $H(r)$ of the entire RR-CCW can be expanded into a linear combination of the $H_n$'s:

$$H(r) = \sum_{n=0}^{M-1} A_n H_n(r), \quad (7)$$

where the $A_n$'s are unknown coefficients.

Then, (7) is substituted into the operator equation (1). By requiring the expansion error to be orthogonal to each of the expansion modes $H_m(r)$ we obtain:

$$\sum_{n=0}^{M-1} A_n \left[ \langle \Theta H_n, H_m \rangle - \left(\frac{\omega}{c}\right)^2 I_{n-m} \right] = 0, \, m = 1, \ldots, M-1, \quad (8)$$

where, $$I_{n-m} \equiv \langle H_n, H_m \rangle \quad (9)$$

and where $\langle F, G \rangle$ is the inner product between the vector functions F and G, defined as $$\langle F, G \rangle \equiv \int_V F \cdot \overline{G} \, dx dy dz. \quad (10)$$

Here $\overline{G}$ is the complex conjugate of G, and the dot denotes the conventional Cartesian scalar product between two vectors. The integration domain extends over the entire three-dimensional space. Using now equations (5) and (6), we obtain:

$$\sum_{n=o}^{M-1} A_n [(\omega_0^2 - \omega^2) I_{n-m} + c^2 \tau_{n-m}] = 0, \, m = 0, \ldots M-1, \quad (11)$$

where $$\tau_{n-m} = \sum_{k \neq n} \langle \Theta_k H_n, H_m \rangle \quad (12)$$

It should be noted that $I_{n-m}, \tau_{n-m}$ depend only on the distance $r_n - r_m$, and they decrease exponentially with the increase of this distance. In principle, equation (11) and these terms are completely equivalent to their "linear" counterparts in the linear CCW problem studied in the aforementioned A. Boag et al.

The known solution for this equation is (see the aforementioned A. Boag et al):

$$A_n = e^{i\kappa(\omega)n} \tag{13}$$

This solution is substituted back into (11) in order to find the dispersion relation $k(\omega)$.

It should be noted that since the local modes $H_n(r)$ are highly localized around $r=r_n$, $I_n$, ($n \neq 0$) is exponentially smaller than $I_0$. It is known that $\tau_1 = \tau_{-1}$ are the dominant terms among the $\tau_n$'s. Using the equation shift-invariance property, and collecting only the dominant terms, the dispersion relation can be received:

$$\omega^2 - \omega_0^2 = 2c^2\tau_1\|H_0\|^{-2}\cos(\kappa) \tag{14}$$

where $\|H_0\|^2 = \langle H_0, H_0 \rangle = I_0$.

Simplifying one step further by using an approximation $\omega^2 - \omega_0^2 \approx 2\omega_0(\omega - \omega_0)$ the dispersion relation in a slightly different form is received $$\omega(k) = \omega_0 \Delta\omega \cos(\kappa), \quad \Delta\omega = c^2\tau_1/(\omega_0 \|H_0\|^2) \tag{15}$$

So far this dispersion relation is completely analogous to the linear-case dispersion obtained in the aforementioned A. Boag et al. However, the invented structure of the present example (a closed loop path of microcavities under Floquet-Bloch condition) is periodic with respect to rotation, the relation $A_n/A_{n-1} = e^{i\kappa}$, that holds for all $0 \leq n \leq M-1$ should hold also between the terms $n=M-1$ and $n=0$ Thus:

$$e^{i\kappa(M-1)}e^{i\kappa} = 1 \Rightarrow \kappa = \kappa_m = 2\pi m/M, \quad m = 0, \pm 1, \pm 2, \ldots \pm (M-1). \tag{16}$$

This condition selects $2M-1$ points on the continuous dispersion curve of (14)-(15). It should be noted that positive or negative values of $\kappa$ correspond to counter-clockwise or clockwise propagation, respectively. However, since (14) and (15) are even with respect to $\kappa$, the two opposing propagation directions possess exactly the same frequency characteristics. In other words, the device according to the structure of the present example, acts as a closed-loop resonator for light components propagating in opposing directions.

It will be shown now, that when the structure of the present example is rotated, light components propagating in opposing directions will possess different frequency characteristics. This is because due to the relative change of the optical paths' length of these two components, the resonance condition will select these different frequencies. Let us consider the entire photonic crystal rotation at angular velocity $\Omega$ around the center of the RR-CCW. The system is at rest in the non-inertial reference frame: $\Re:(x',y',z')$. Without loss of generality, the assumption of the rotation around $z$ is made:

$$\Omega = \hat{z}\Omega_0 \tag{17}$$

where $\Omega_0$ is the angular velocity magnitude possessing a positive or a negative sign for counter-clockwise or clockwise rotation, respectively. Thus, $$\begin{pmatrix} x' \\ y' \\ z' \end{pmatrix} = \begin{pmatrix} \cos(\Omega_0 t) & \sin(\Omega_0 t) & 0 \\ -\sin(\Omega_0 t) & \cos(\Omega_0 t) & 0 \\ 0 & 0 & 1 \end{pmatrix} \begin{pmatrix} x \\ y \\ z \end{pmatrix} \tag{18}$$

where the RR-CCW lies in the x'-y' plane.

Let us solve the Maxwell's equations for a rotating system $\Re$, assuming the following:

(i) in $\Re$, the system geometry does not vary in time, (ii) the angular velocity $\Omega_0$ and the maximal dimension L of the photonic crystal satisfy the condition that $|\Omega_0 L| << c$, thus no relativistic effects take place, (iii) consistent with such slow (non-relativistic velocity assumption, no geometrical transformations or deformations take place (thus, for example, the $\nabla$ operator is conserved: $\nabla = \nabla'$); for the very same reason, time is invariant in both systems: $t = t'$.

According to the formal structure of electrodynamics, the basic physical laws are invariant under all space-time transformations (including non-inertial ones). Therefore, the source-free Maxwell's equations in $\Re$ are given by the aforementioned Anderson et al. and T. Shiozawa:

$$\nabla' \times E' = i\omega B', \quad \nabla' \cdot B' = 0 \tag{19}$$

$$\nabla' \times H' = -i\omega D', \quad \nabla' \cdot D' = 0 \tag{20}$$

The transformation from the inertial system I to the rotating one $\Re$ is manifested via the local constitutive relations. Considering the material properties at rest as $\epsilon$, $\mu$, then up to the first order in velocity the constitutive relations in $\Re$ take on the form [T. Shiozawa]

$$D' = \epsilon E' - c^{-2} \Omega \times r' \times H' \tag{21}$$

$$B' = \mu H' + c^{-2} \Omega \times r' \times E' \tag{22}$$

Placing (21)-(22) into (19)-(20), the Maxwell's equations become, $$D_f \times E' = i\omega\mu H' \tag{23}$$

$$D_f \times H' = -i\omega\epsilon E' \tag{24}$$

where $D_f$ is the operator defined as:

$$D_f \equiv \nabla' - ik\beta(r'), \quad k = \omega/c, \quad \beta(r') = c^{-1}\Omega \times r' \tag{25}$$

The standard procedure of deriving the wave equation for H', with $D_f$ replacing $\nabla$, can now be applied. The resulting equation is $D_f \times (1/\epsilon_r) D_f \times H' = k^2 H'$. By collecting terms that are the first order only (with respect to velocity) and rearranging, a new wave equation can be written:

$$\Theta' H' = k^2 H' + ik\left(\nabla' \times \frac{1}{\epsilon_r}\beta(r') \times H' + \frac{1}{\epsilon_r}\beta(r') \times \nabla' \times H'\right) \tag{26}$$

This is the new wave equation that has to be solved. Here $\Theta'$ is defined the same as $\Theta$ in (2), but with the coordinates (x',y',z') of the RR-CCW in the non-inertial system. The difference between this equation, and the equation of the system at rest (1) is only in the introduction of the additional terms multiplied by ik in the right hand side.

It has been shown [H. J. Arditty and H. C. Lefevre, "Sagnac Effect in Fiber Gyroscopes," *Optics Letters*, 6(8), 401-403 (1981)] that the effect of rotation on the modal shape of the field is generally completely negligible. The major contribution of the Sagnac effect is manifested in the phase property of the field. Thus, motivated by the expansion of the field in the system at rest, exactly the same expansion can be used for the purposes of the invention:

$$H'(r') = \sum_{n=0}^{M-1} A_n H_n(r'), \quad H_n(r') = H_0(r' - r'_n), \tag{27}$$

where the Sagnac effect is expressed essentially through the modal amplitudes and phases, i.e. through the $A_n$'s.

Furthermore, from the very same reasons, the solution procedure for non-rotating conditions applies here as well. It should be emphasized that the expansion functions $H_n$'s are treated as pure mathematical entities; these are not field quantities that must obey electrodynamics laws (while their sum according to (27) should). Since $\nabla = \nabla'$ by item (iii) above, we have:

$$(\Theta'^{per} + \Theta'_n) H_n(r') = k_0^2 H_n(r'), \quad k_0 = \omega_0/c \tag{28}$$

Substituting (27) into (26), and following exactly the same procedure executed for the system at rest, an equation similar to (8), but with correction terms $F_{nm}$ has been received:

$$\sum_{n=0}^{M-1} A_n [\langle \Theta' H_n, H_m \rangle - k^2 I_{n-m}] = ik \sum_{n=0}^{M-1} A_n F_{nm}, \tag{29}$$

$$m = 0, \ldots M - 1,$$

where $I_{n-m}$ is defined as in (9), the inner product is defined similarly to that in the inertial system and $$F_{nm} = \left\langle \nabla' \times \frac{\beta}{\varepsilon_r} \times H_n, H_m \right\rangle + \left\langle \frac{\beta}{\varepsilon_r} \times \nabla' \times H_n, H_m \right\rangle, \tag{30}$$

and where and $\beta = \beta(r')$ and k are defined as in (25). $F_{nm}$ can be simplified and expressed as:

$$F_{nm} = \left\langle \frac{\beta}{\varepsilon_r}, H_n \times \nabla' \times H_m \right\rangle - \left\langle \frac{\beta}{\varepsilon_r}, H_m \times \nabla' \times H_n \right\rangle \tag{31}$$

$$= \begin{cases} 0 & n = m \\ 2\dfrac{\Omega_0}{c} q_{n-m} & n \neq m \end{cases}$$

where the realness of the modes $H_m$ has been used, and (by using $\beta = \Omega_0 \hat{z} \times r'/c = \Omega_0 |r'| \hat{\phi}/c$ and obvious symmetries):

$$q_{n-m} = \left\langle \frac{|r'|}{\varepsilon_r} \hat{\phi}', H_n \times \nabla' \times H_m \right\rangle = -q_{m-n}. \tag{32}$$

Substituting this back into (30), using (28), and recalling that $\Theta'$ can be decomposed as in (5), we obtain:

$$\sum_{n=0}^{M-1} A_n [(\omega_0^2 - \omega^2) I_{n-m} + c^2 \tau_{n-m}] = i 2 \omega \Omega_0 \sum_{n, n \neq m}^{M-1} A_n q_{n-m}, \tag{33}$$

$$m = 0, \ldots M - 1,$$

This is the "rotating counterpart" of (11). Similarly to the static problem, the coefficients here depend only on the distance $r_n - r_m$, and decrease exponentially as this distance increases.

Thus, a solution in the form of (13) is sought and the procedure followed (13) is repeated. The result is the $\Omega_0$-dependent dispersion relation:

$$\omega^2 - \omega_0^2 = 2c^2 \tau_1 \|H_0\|^{-2} \cos(\kappa) + 4\omega \Omega_0 q_1 \|H_0\|^{-2} \sin(\kappa) \tag{34}$$

Assuming again that $\omega \approx \omega_0$ (as with the stationary system), and slow rotations, this result can be rewritten as:

$$\omega(\kappa) = \omega_0 + \Delta\omega \cos(\kappa - \Omega_0 Q) \tag{35}$$

where the bandwidth $\Delta\omega$ is identical to that of the stationary CCW given in (15), Q is given by $$Q = 2\omega_0 q_1/(c^2 \tau_1) \tag{36}$$

It is important to note, that the $2\pi$-periodicity (resonance) requirement is present, for which the selection rule in (16) holds. Thus, the dispersion that has been sought, is defined by (35) and (36).

Figure 5:
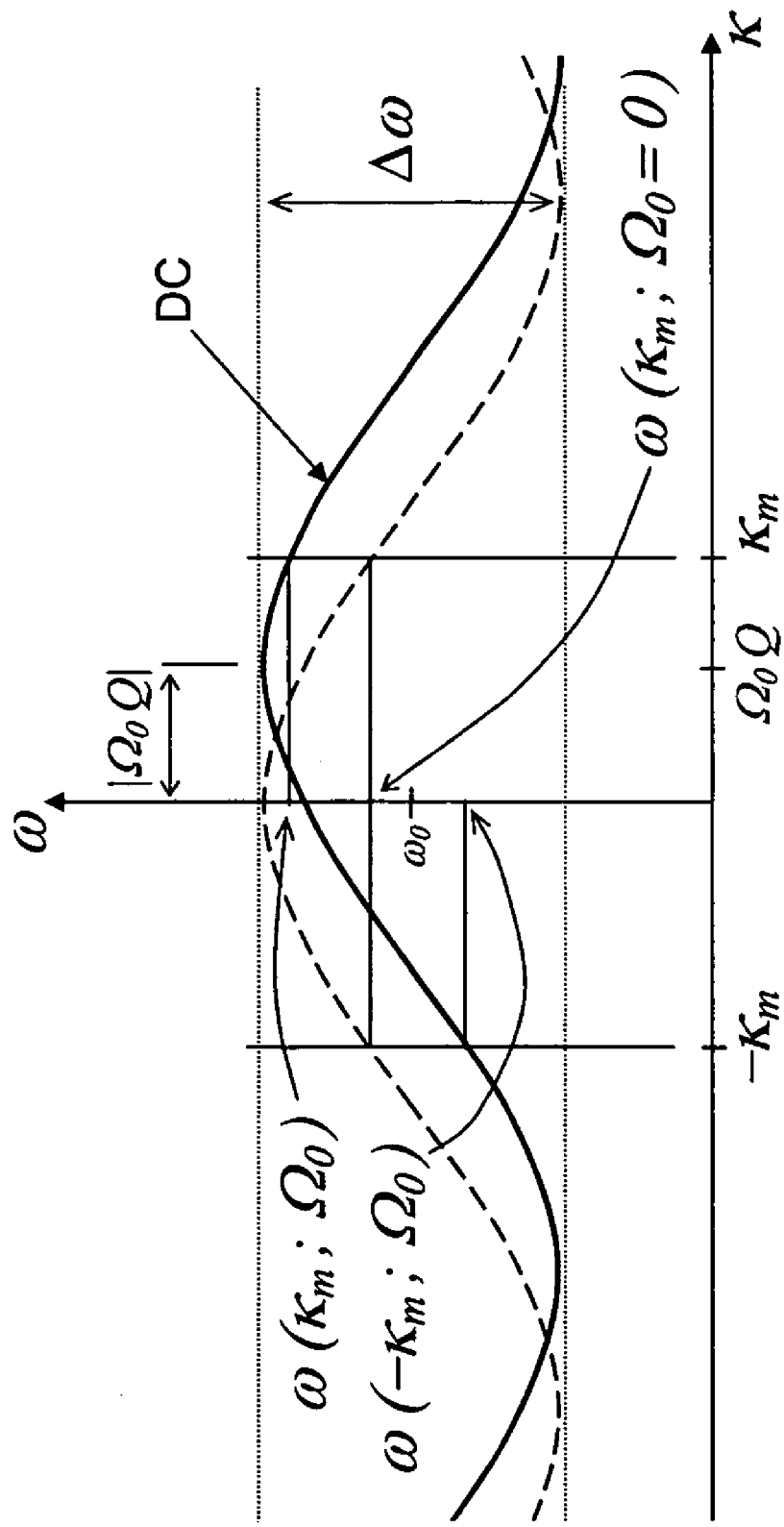
FIG. 5 shows a dispersion curve of a coupled cavities based guide in a photonic crystal for a rotating system compared to that of the stationary system.

In reference to FIG. 5, there is shown a dispersion curve DC (solid curve) according to (35) and (36). Unlike the stationary system (dashed curve), dispersion curve DC for the rotating system is not symmetric around the origin of the $\kappa$-axis. While for the stationary system there is a single frequency $\omega(\kappa_m) = \omega(-\kappa_m)$ for a given $|\kappa_m|$, satisfying the $2\pi$-periodicity requirement, in the rotating system this frequency is split into two different frequencies $\omega(\kappa_m; \Omega_0)$ and $\omega(-\kappa_m; \Omega_0)$ corresponding to clockwise and counter-clockwise propagations of light through the RR-CCW. The difference in frequencies $\omega(\kappa_m; \Omega_0)$ and $\omega(-\kappa_m; \Omega_0)$ is due to the shift $\Omega_0 Q$, linearly depending on the rotation frequency.

Using (35) and (36), it is seen that the beat frequency obtained when both clockwise and counter-clockwise propagations are present, is given by ($\kappa_{-m} = -\kappa_m$):

$$\omega_b = \omega(\kappa_m; \Omega_0) - \omega(-\kappa_m; \Omega_0) = 2\Delta\omega \sin(\Omega_0 Q) \sin(2m\pi/M) \tag{37}$$

Assuming that M is large, the maximal beat frequency is obtained when $\sin(2m\pi/M) \approx 1$. Thus, for slow rotations:

$$\omega_b \approx 2\Omega_0 \Delta\omega Q, \tag{38}$$

where Q is given by (36).

While the above-presented theoretical results characterize the system dynamics parameters $q_1$, the parameters $\tau_1$ and consequently Q are given in terms of operators on field quantities that are not easily calculated. It is most desirable to get an estimate for Q using physical quantities that are easier to compute or to measure. To this end, equation (15) can be used to express $\tau_1$ in terms of the system bandwidth (identical in I and $\Re$), and substitute it in the expression (36) for Q. With this, the expression for $\omega_b$ becomes $$\omega_b = 4\Omega_0 q_1 \|H_0\|^{-2}. \tag{39}$$

Furthermore, assuming that the RR-CCW radius R is large compared to the microcavity dimensions, and recalling that the microcavity field $H_n(r')$ is highly localized within it, parameter $q_1$ can be approximated as $$q_1 \approx R \langle \epsilon_r^{-1} \hat{\phi}, -H_1 \times i\omega_0 \epsilon_{d_0} E_0 \rangle \qquad (40)$$

where $\epsilon_{d_n} = \epsilon_d(r-r_n)$ with the latter defined after (2).

It should be noted that since $E_0$, $H_0$ are the mode functions of isolated microcavity, their mutual Poynting vector does not carry real power. Power flow in the CCW is only due to terms of the form $\Re E_0 \times H_1$. Therefore, the second quantity in the inner product in (40) is larger than or equal to the volume average (over a CCW microcavity) of $\epsilon_{d_0} S$, where S is the net real power that flows along the circular path. It should also be noted that the total electromagnetic power stored in a microcavity volume is $\frac{1}{2}(\epsilon\|E_0\|^2 + \mu\|H_0\|^2)$. However, all cavities are close to resonance; the electric and magnetic stored energies are equal. Hence, the total electromagnetic power stored in the volume of each microcavity is $U = \mu_0 \|H_0\|^2$. The group velocity $v_g$ is given by the ratio of the power flow S (averaged over medium period) to the stored energy U.

Considering the above notes and keeping in mind equation (40), it is now straightforward to show that, $$q_1 \|H_0\|^{-2} \geq R v_g \omega_0 / c^2 \qquad (41)$$

where R is the RR-CCW radius.

At the point of maximal slope and beat frequency ($\kappa_m \approx \pi/2$), the group velocity is $v_g = \Delta\omega \cdot b$, where b is the inter-cavity spacing. Thus, from (41), we get:

$$\omega_b \geq 4\Omega_0 R b \Delta\omega \omega_0 c^{-2} \qquad (42)$$

This last result is a rough estimate of the beat frequency due to rotating RR-CCW in photonic crystals. Also, the RR-CCW phase sensitivity to rotation is estimated:

$$Q \geq 2 R b \omega_0 / c^2 \qquad (43)$$

New parameters, such as the system bandwidth and the intercavity spacing (not considered in classical studies of Sagnac effect), determine the beat frequency in the RR-CCW.

It should be recognized, however, that $\Delta\omega$ and b cannot be chosen freely and independently. In fact, it has been shown that $\Delta\omega$ decreases exponentially when b increases (according to Boag et al). This can be seen also in (12) and (15): since the microcavity mode $H_0$ is exponentially decreasing, and since $\tau_1$ in (12) consists of essentially an overlapping integral of the fields of two neighboring microcavities, the resulting bandwidth $\Delta\omega$ decreases fast when b is increased.

Figure 6:
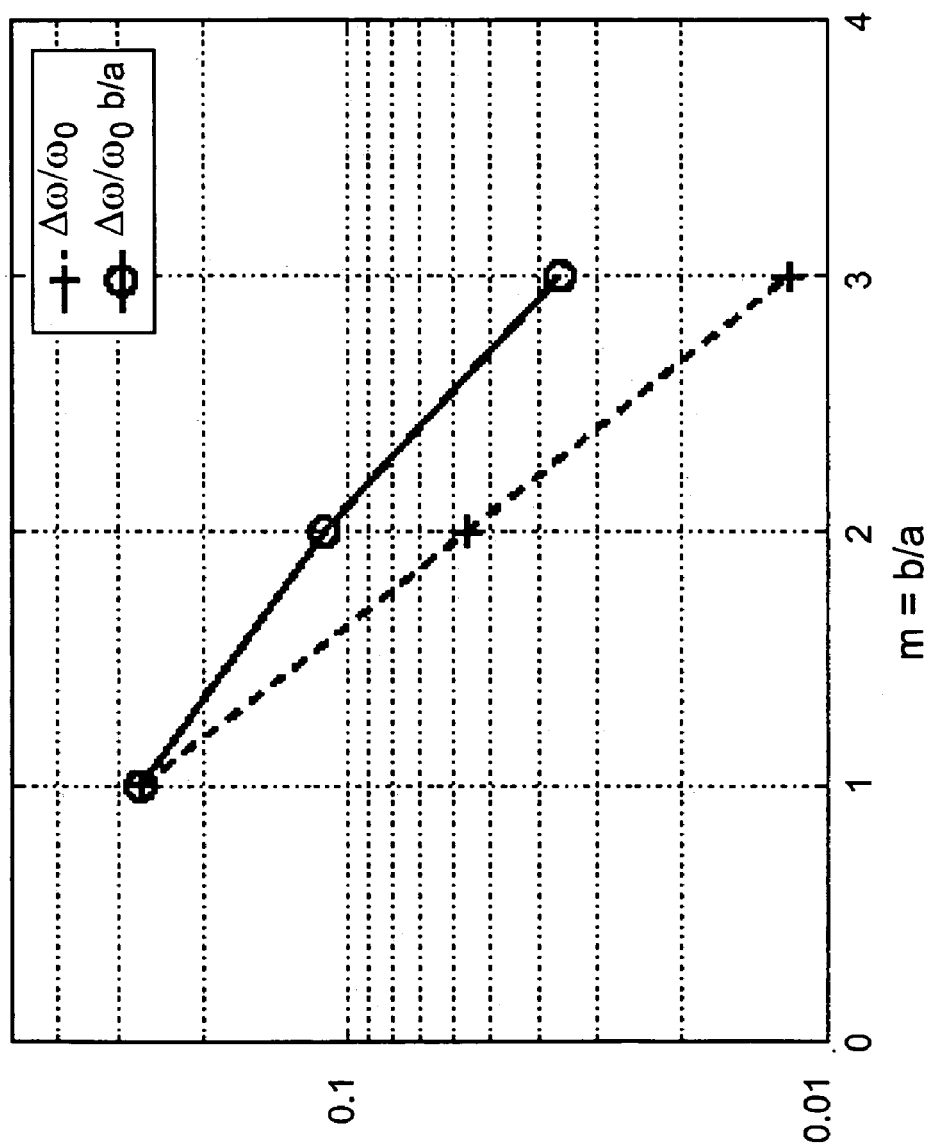
FIG. 6 shows graphically an example of the parameters of a CCW in a photonic crystal with hexagonal symmetry.

FIG. 6 exemplifies dependences of a relative bandwidth $\Delta\omega/\omega_0$ and a parameter $(\Delta\omega/\omega_0)(b/a)$ on a ratio (b/a) for a CCW in a photonic crystal with hexagonal symmetry. There, a is the length of the photonic crystal primitive lattice vector. It should be noted that this example actually relates to the case of CCWs in a PhC as discussed in reference [Boag et al], and where the cavities are situated along one of the fundamental lattice vectors—such as the smaller ring 12B' in FIG. 4. For a different PhC structure, and/or for the case an inter-cavity spacing vector of a different orientation is defined (i.e. it is not aligned exactly with only one of the fundamental lattice vectors—such as the larger ring 12B in FIG. 4), these dependencies might be somewhat different.

For an operating wavelength of about 1 μm, the primitive lattice vector a has a length of about 0.5 cm (Bragg condition). Using the data of FIG. 6, it is seen that for a CCW with intercavity spacing of two lattice cells (m=2) the parameter $(\Delta\omega/\omega_0)(b/a)$ is about 0.11. Considering equation (42), the beat frequency is $\omega_b \approx 1.6 \times 10^7 \times R \cdot \Omega_0$. For RR-CCW with radius of about 1 mm this yields $\omega_b \approx 1.6 \times 10^4 \Omega_0$. Thus, using a light signal of 1 micron wavelength, and a Photonic Crystal structure occupying a domain of 1 millimeter radius, the device is capable of detecting rotation rates of the order of $10^{-4}$ radians per second or even smaller.

It should be noted that one of the features of the present invention is the added degree of freedom in the gyro design, for achieving maximum sensitivity, or adopting the structure to specific performance requirements. For example, one may seek for cavity design and inter-cavity spacing that maximize $q_1$ in equation (40) and thus maximize the beat frequency for a given rotation rate.

A partial optimization of the beat frequency may be achieved by increasing the resonance frequency and/or increasing a value of a product of the intercavity spacing and the bandwidth. In many cases, this product will be maximized if the intercavity spacing is of about the lattice constant, because the subsequent increase in bandwidth will overcompensate for the decrease in the intercavity spacing. Hence, the intercavity spacing is preferably selected to be of about the lattice constant. In this connection, it should be noted, that the minimal value of the intercavity spacing is determined by the regime of propagation through coupling.

Figure 7:
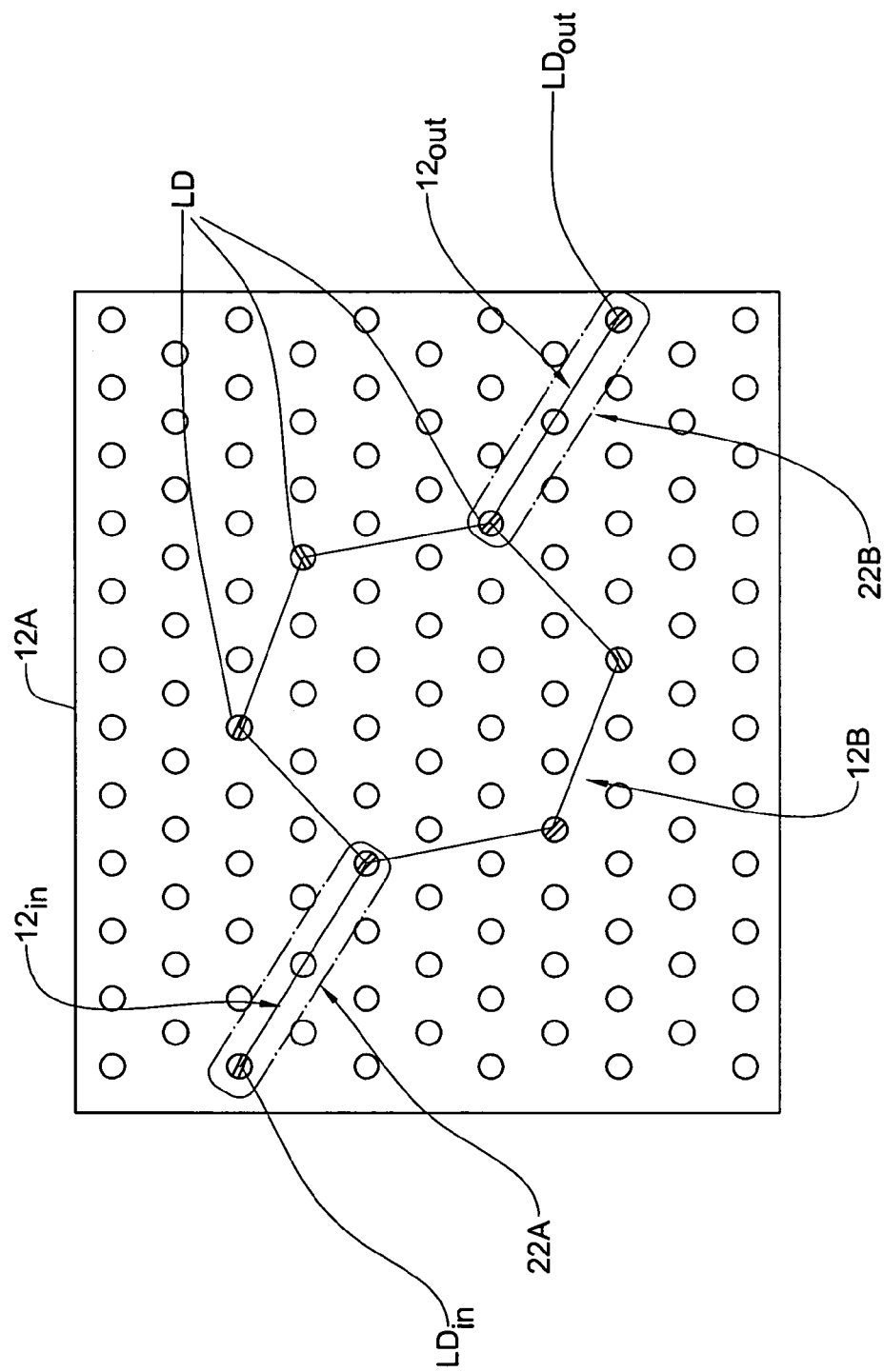
FIG. 7 exemplifies yet another example of the gyroscope system of the present invention utilizing a photonic crystal with a closed-loop path of defects therein.

In FIG. 7 an example of the device design, using linear CCW's as a mean to guide the optical signal from a light source towards curvilinear path 12B and from the latter to a light detector, is shown. In the device of FIG. 7, these input and output light paths are denoted $12_{in}$ and $12_{out}$ and, are also implemented within the defected photonic crystal, namely light is guided here through the microcavities. Microcavities $LD_{in}$ and $LD_{out}$ are the end microcavities of input and output CCW's implementing paths $12_{in}$ and $12_{out}$; respectively. Microcavities $LD_{in}$ and $LD_{out}$ are coupled to microcavities LD of path 12B through coupling regions 22A and 22B.

In order to substantially preserve light within light path 12B, e.g. for implementing the 2π-condition and enabling beat frequency measurements, coupling of microcavities $LD_{in}$ and $LD_{out}$ to the microcavities implementing path 12B is made weaker than coupling of the microcavities of path 12B to each other. The weaker coupling may be achieved, for example, by distancing or disorientating the microcavities $LD_{in}$ and $LD_{out}$ with respect to the microcavities of path 12B. Coupling regions 22A and 22B are preferably configured to provide equal lengths of paths and intensities for clockwise and counter-clockwise light propagating components, i.e. to support the "reciprocity" property discussed above.

It should be noted that the structural disorder resulting e.g. from the design and fabrication inaccuracies may formally affect the CCW's and RR-CCW's operation. However, it has been shown in [B. Z. Steinberg, A. Boag, and R. Lisitsin "Sensitivity analysis of narrow-band Photonic Crystal filters and waveguides to structure variations and inaccuracy," *J. Opt. Soc. Am. A*, Vol. 20(1), pp. 138-146, January 2003] that the CCW's sensitivity with respect to the structural disorder possesses a threshold-like character; CCW is practically insensitive to disorder below a certain level, but may cease to operate if the disorder exceeds this level. This threshold has been fully characterized and studied in Steinberg et al.

It should be noted, although not specifically shown here, that a closed loop light guide with coupled optical resonators (described above, by way of not limiting examples, as being formed by defects in a photonic crystal) may be constituted by a closed loop waveguide with an array of small closed loop waveguides arranged in a circular array thereinside.

The following are some more examples of the implantation of the device of the present invention.

Figure 8:
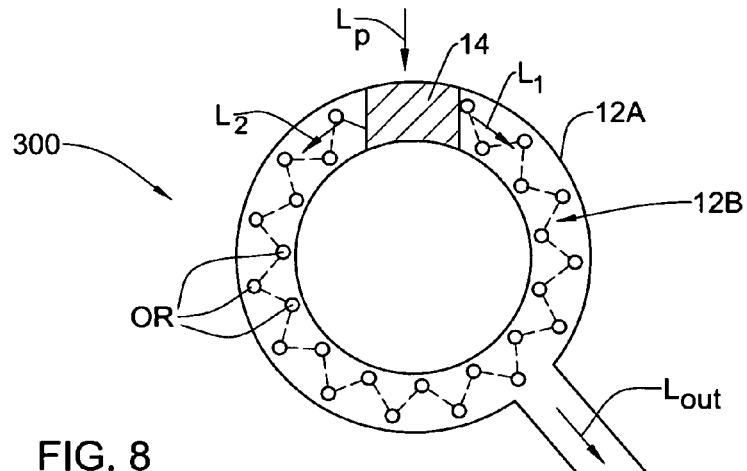
FIG. 8 is a schematic illustration of another example of the device of the present invention employing a closed loop photonic crystal light guide with local defects arranged in a curvilinear path, and utilizing an active medium inside the closed loop light guide.

Reference is made to FIG. 8 exemplifying a device 300 including a light guide 12A with a curvilinear path 12B formed by optical resonators OR. In device 300, similar to device 200, the light guide is of a closed loop configuration of a photonic crystal and the optical resonators are local defects in the crystal. However, here a light source 14 is constituted by an active medium (lasing medium) incorporated in light guide 12A, and curvilinear path 12B couples the opposite sides of active medium 14. When this active medium 14 is pumped by light $L_p$, emitted light components $L_1$ and $L_2$ are produced propagating in opposite directions through the light guide, i.e. through curvilinear path 12B formed by optical resonators OR. Such light guide with an active medium therein thus operates as a resonator cavity. The inventors have been first to investigate, the effect of rotation along a circular path within a photonic is crystal. When the device (the light guide) is subjected to rotation, the optical length passed by light circulating through the resonator cavity changes, causing a change in the frequency of light. As the detector actually collects light being superposition of light components $L_1$ and $L_2$, this frequency change is detected as the beat frequency.

Figure 9:
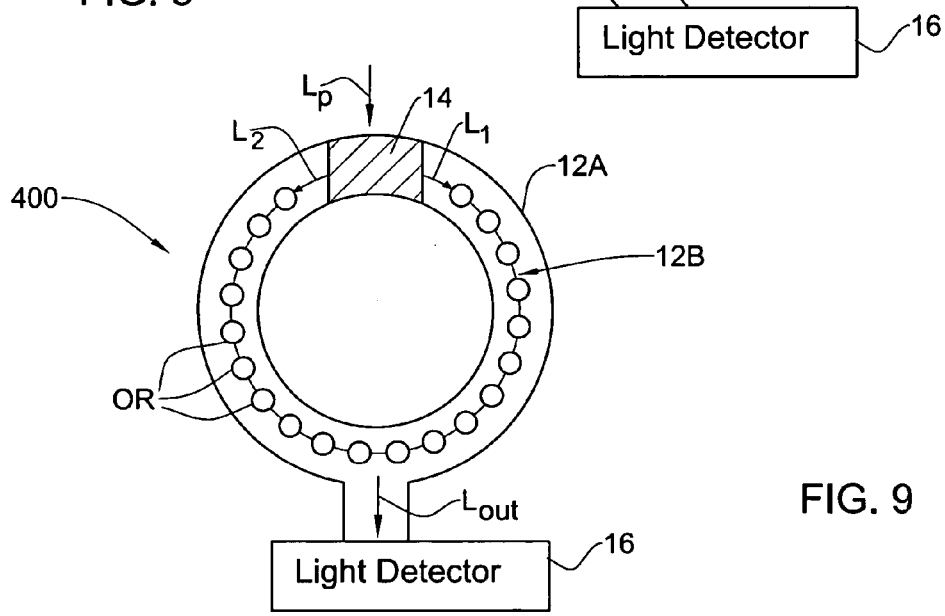
FIG. 9 schematically illustrates yet another example of a device of the present invention utilizing a closed loop light guide in the form of a waveguide carrying an array of small closed loop waveguides (resonators)

As indicated above, a light guide with a curvilinear path of optical resonators may be constituted by a closed loop wavelength with a circular array of small closed loop waveguides therein. This is exemplified in FIG. 9, showing a device 400 including a light guide 12A in the form of a closed loop waveguide, and an array 12B of closed loop waveguides (ring-like waveguides) presenting optical resonators OR. Device 400 is similar to device 300 in that a light source is an active medium inside waveguide 12A, and thus operates similar to device 300.

Figure 10:
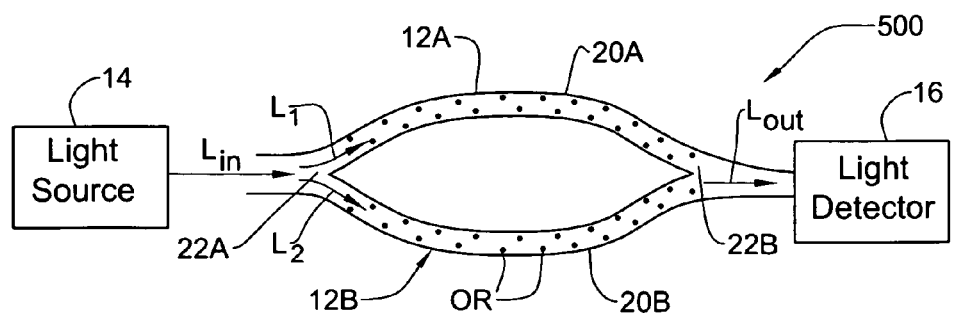
FIG. 10 shows yet another example of the invention configured with a two-path light guide coupled at the input and output coupling regions.

FIG. 10 shows yet another example of the present invention. A device 500 includes a light guide 12A and a curvilinear path 12B formed by coupled optical resonators OR inside the light guide. In the present example, light guide 12A is configured to define first and second light paths (channels) 20A and 20B coupled to each other at spaced-apart coupling regions 22A and 22B. It should be understood that for the purposes of the present invention, at least one of light paths 20A and 20B is curved, both being curved in the illustrated example. In the configuration of FIG. 10, light paths 20A and 20B between input and output coupling regions 22A and 22B are substantially of the same length. Input light $L_{in}$ is coupled from a light source 14 into light guide 12A at region 22A, and is thus split into first and second light components $L_1$ and $L_2$ directed along light paths 20A and 20B, respectively. At region 22B, these light components are combined into a common output path towards a detector 16. Rotation of device 500 (about an axis tilted with respect to a plane defined by the light guide) results in a change in phase of light components $L_1$ and $L_2$ arriving at the detector (i.e., at coupling region 22B) due to a change in the optical lengths passed by these light components.

Those skilled in the art will readily appreciate that various modifications and changes can be applied to the embodiments of the invention as hereinbefore described without departing from its scope defined in and by the appended claims.

The invention claimed is:

1. A method for rotation sensing comprising passing light through a rotating light guide comprising an arrangement of a plurality of coupled optical resonators arranged along a curvilinear optical path, thereby enabling determination of a change in at least one of the light phase and frequency affected by the light propagation through the rotating curvilinear path, said change being indicative of the rotation rate of the light guide.

2. The method of claim 1, wherein the light guide with the coupled optical resonators is constituted by a photonic crystal with microcavities.

3. The method of claim 1, wherein the light passes through closed loop light guide, said light being in the form of first and second light components propagating through the light guide in opposite directions, respectively.

4. The method of claim 3, comprising causing the first and second light components circulation in the light guide, thereby producing light resulting from combination of the circulating first and second light components and being indicative of the frequency change between the circulating first and second light components.

5. The method of claim 4, comprising coupling input finite bandwidth light into the light guide thereby splitting the input light into light components propagating in the opposite directions, and producing said first and second circulating light components, light resulting from combination of the circulating first and second light components being indicative of the change in their resonance frequencies.

6. The method of claim 4, producing said circulating first and second light components from light generated by an optically active medium located inside a closed loop light guide, said curvilinear optical path coupling opposite sides of the active medium, the closed loop light guide thereby operating as a resonator cavity, the light resulting from the combination of the circulating first and second light components being indicative of the change in resonance frequency of light generated by the active medium.

7. The method of claim 4, comprising collecting the light resulting from the combination of the first and second light components, thereby determining said frequency change.

8. The method of claim 7, comprising measuring a beat frequency of the collected light.

9. The method of claim 7, comprising measuring an envelope of time variation of a light intensity, said envelope being indicative of a beat frequency of the collected light resulting from said combination.

10. The method of claim 8, wherein the light guide with the coupled optical resonators is constituted by a photonic crystal with microcavities, the rotating rate, $\Omega_0$, being determined as:

$$\Omega_0 = \frac{\omega_b \cdot c^2}{4 \cdot R \cdot b \cdot (\Delta\omega) \cdot \omega_0}$$

wherein $\Delta_\omega$ is the measured beat frequency, c is the velocity of light in vacuum, R is the closed loop radius, b is the intercavity spacing, $\Omega_0$ is the isolated microresonator resonance; and $\Delta\omega$ is the bandwidth of the coupled cavity waveguide (CCW).

11. The method of claim 8, comprising calibrating the process of light propagation through the rotating light guide to determine a ratio between a measured beat frequency and a known value of the rotating rate.

12. The method of claim 3, wherein a closed loop path defined by the closed loop light guide substantially circular path.

13. The method of claim 1, wherein said passing light through the light guide comprising directing the light through first and second spatially separated light paths and combining said first and second paths into a third path, at least one of the first and second light path comprising said plurality of coupled optical resonators arranged along the curvilinear optical path, collecting light at said third path enabling said determination of the change in phase of light affected by the light propagation through the rotating curvilinear path.

14. The method of claim 13, wherein the first and second light paths have substantially equal optical lengths in a non-rotating condition of the light guide.

15. The method of claim 13, wherein first and second light beams propagating along the first and second paths are of substantially equal frequency and intensity.

16. The method of claim 13, comprising detecting the intensity of said third beam as a function of time.

17. The method of claim 1, wherein said coupled optical resonators are closed-loop waveguides.

18. A device for determining a rate of rotation of an object with which the device is associated, the device comprising a light guide comprising an arrangement of a plurality of coupled optical resonators arranged along a curvilinear optical path, thereby enabling determination of a change in at least one of the light phase and frequency affected by the light propagation through the curvilinear path during the rotation, said change being indicative of the rotation rate of the light guide.

19. The device of claim 18, wherein said coupled optical resonators are microcavities in a photonic crystal.

20. The device of claim 19, wherein the microcavities are arranged in the photonic crystal such that relative orientation of each microcavity with respect to its neighbors is preserved along the curvilinear path.

21. The device of claim 19, wherein an inter cavity spacing is of about the photonic crystal lattice constant.

22. The device of claim 18, comprising a light detection unit accommodated to collect light output from the light guide and generate data indicative thereof.

23. The device of claim 22, comprising a control unit connected to the output of the light detection unit to process said data indicative of the collected light and determine the change in at least one of the light phase and frequency indicative of the rotation rate of the light guide.

24. The device of claim 18, wherein said light guide is configured to define a closed loop light path including said curvilinear optical path.

25. The device of claim 24, wherein the light guide is configured as a resonator cavity for first and second light components circulating in the light guide in opposite directions, light resulting from a combination of the first and second circulating light components being indicative of a resonance frequency change between said first and second light components.

26. The device of claim 25, comprising a light source assembly configured to produce said first and second light components circulating through the closed loop light guide in opposite directions.

27. The device of claim 25, wherein said light guide comprises a light input port for coupling light from an external light source assembly thereby causing splitting of the coupled light into light components directed in opposite directions, including said first and second light components circulating through the closed loop light guide in the opposite directions.

28. The device of claim 25, wherein said first and second light components have substantially equal intensity.

29. The device of claim 27, wherein the input light being coupled into the light guide is a finite bandwidth light.

30. The device of claim 26, wherein said light source assembly comprises an optically active medium located inside the light guide, said curvilinear optical path coupling opposite sides of the active medium.

31. The device of claim 30, wherein the active medium is configured and operable to direct light generated thereby to opposite directions of propagation through the curvilinear path.

32. The device of claim 31, comprising a control unit configured for receiving data indicative of the light resulting from said combination of the first and second circulating light components and for processing said data and determining a beat frequency of light resulting from said combination, said beat frequency being indicative of the resonance frequency change.

33. The device of claim 31, comprising a control unit configured for receiving data indicative of the light resulting from said combination of the first and second circulating light components and determining an envelope of time variation of light intensity, said envelope being indicative of the beat frequency of light resulting from said combination, said beat frequency being indicative of the resonance frequency change.

34. The device of claim 32, wherein said coupled optical resonators are microcavities in a photonic crystal, the rotating rate, $\Omega_0$, being determined as:

$$\Omega_0 = \frac{\omega_b \cdot c^2}{4 \cdot R \cdot b \cdot (\Delta\omega) \cdot \omega_0}$$

wherein $\omega_b$ is the measured beat frequency, c is the velocity of light in vacuum, R is the closed loop radius, b is the intercavity spacing, $\omega_0$ is the isolated micro-resonator resonance; and $\Delta\omega$ is the bandwidth of the CCW.

35. The device of claim 32, wherein the control unit comprises a memory utility for storing reference data including calibration results indicative of a ratio between a measured value of a beat frequency and a known value of the rotating rate.

36. The device of claim 24, wherein said closed loop path is substantially circular path.

37. The device of claim 24, wherein the length of the closed loop path while in a non-rotating state is selected to provide a resonance condition at a frequency $\omega_0$ which is the resonance frequency of the isolated microcavity.

38. The device of claim 18, wherein said light guide is configured to define a light splitter for splitting input light into first and second spatially separated light paths and a light combiner for combining said first and second paths into a third path, at least one of the first and second light path comprising said plurality of coupled optical resonators arranged along the curvilinear optical path.

39. The device of claim 38, wherein said coupled optical resonators are microcavities in a photonic crystal.

40. The device of claim 38, comprising a light detection unit accommodated for collecting light at said third path and generating data indicative thereof.

41. The device of claim 40, comprising a control unit connected to the output of the detection unit and configured for processing said data to determine the change in phase of light affected by the light propagation through the rotating curvilinear path.

42. The device of claim 39, wherein the first and second light paths have substantially equal optical lengths in a non-rotating condition of the light guide.

43. The device of claim 39, wherein first and second light beams propagating along the first and second paths are of substantially equal frequency and intensity.

44. The device of claim 18, wherein said coupled optical resonators along the curvilinear path are arranged in a substantially equally spaced relationship.

45. The device of claim 18, wherein said coupled optical resonators are closed loop waveguides.

46. The device of claim 18, configured as an optical gyroscope, said gyroscope having a reduced size for a required optical length of light propagation therethrough.

47. The device of claim 18, wherein the arrangement of coupled microcavities is a substantially periodic structure.

48. The device of claim 18, comprising a housing for packaging the light guide therein, said housing being made of a material screening its inside from external electromagnetic fields.

49. A device for determining a rate of rotation of an object with which the device is associated, the device comprising a light guide comprising an arrangement of a plurality of coupled optical resonators arranged along a curvilinear optical path, the light guide being configured to define a closed loop path for light propagation including said curvilinear optical path, the device being configured and operable as a resonator cavity for first and second light components circulating in the light guide in opposite directions, respectively, thereby enabling determination of a resonance frequency change between the first and second light components affected by their circulation through the light guide during the rotation, said change being indicative of the rotation rate of the light guide.

50. A device for determining a rate of rotation of an object with which the device is associated, the device comprising a light guide formed by a photonic crystal formed with a plurality of coupled microcavities arranged along a curvilinear optical path in the photonic crystal, the light guide being configured to define a closed loop path for light propagation including said curvilinear optical path, the device being configured and operable as a resonator cavity for first and second light components circulating in the light guide in opposite directions, respectively, thereby enabling determination of a resonance frequency change between the first and second light components affected by their circulation through the light guide during the rotation, said change being indicative of the rotation rate of the light guide.

51. A device for determining a rate of rotation of an object with which the device is associated, the device comprising a light guide formed by a photonic crystal formed with a plurality of coupled microcavities arranged along a curvilinear optical path in the photonic crystal, the light guide being configured to define a closed loop path for light propagation including said curvilinear optical path and including an optically active medium, the device being configured and operable as a resonator cavity for first and second light components emitted by said active medium and circulating in the light guide in opposite directions, respectively, thereby enabling determination of a resonance frequency change between the first and second light components affected by their circulation through the light guide during the rotation, said change being indicative of the rotation rate of the light guide.

52. A device for determining a rate of rotation of an object with which the device is associated, the device comprising a light guide configured as a closed loop waveguide carrying therein a plurality of coupled closed loop waveguides arranged along a curvilinear optical path, the device being configured and operable as a resonator cavity for first and second light components circulating in the light guide in opposite directions, respectively, thereby enabling determination of a resonance frequency change between the first and second light components affected by their circulation through the light guide during the rotation, said change being indicative of the rotation rate of the light guide.

* * * * *

UNITED STATES PATENT AND TRADEMARK OFFICE
CERTIFICATE OF CORRECTION

PATENT NO. : 7,385,177 B2 Page 1 of 1
APPLICATION NO. : 11/325632
DATED : June 10, 2008
INVENTOR(S) : Steinberg et al.

It is certified that error appears in the above-identified patent and that said Letters Patent is hereby corrected as shown below:

Please correct claim 10, column 18, line 56, delete "$\Delta_\omega$" and insert --$\omega_b$--.
In line 58, delete "$\Omega_0$" and insert --$\omega_0$--.

Signed and Sealed this

Thirteenth Day of October, 2009

David J. Kappos
*Director of the United States Patent and Trademark Office*